United States Patent
Oswald

[11] Patent Number: 6,065,790
[45] Date of Patent: May 23, 2000

[54] APPARATUS FOR HAULING AN ANIMAL CARCASS

[76] Inventor: Matthew Oswald, 327 Franklin St., Alburtis, Pa. 18011

[21] Appl. No.: 09/195,418

[22] Filed: Nov. 17, 1998

[51] Int. Cl.⁷ ................................................. B65G 7/12
[52] U.S. Cl. ......................... 294/74; 294/150; 294/165; 224/921
[58] Field of Search .............................. 294/74, 140, 141, 294/150, 157, 165, 149; 224/103, 184, 921; 119/792, 793; 452/187; 54/24, 34

[56] References Cited

U.S. PATENT DOCUMENTS

| | | | |
|---|---|---|---|
| D. 333,695 | 3/1993 | Gatto et al. | D22/199 |
| 923,369 | 6/1909 | McClintock | 54/24 |
| 1,278,021 | 9/1918 | Robinson | 54/24 |
| 1,362,505 | 12/1920 | Pierce | 119/793 |
| 2,931,629 | 4/1960 | Keller | 254/195 |
| 2,996,228 | 8/1961 | Bauman | 224/5 |
| 3,038,644 | 6/1962 | Johnson | 224/5 |
| 3,077,292 | 2/1963 | Gehrke | 224/5 |
| 4,243,164 | 1/1981 | Burlison et al. | 224/52 |
| 4,317,257 | 3/1982 | Engel | 294/74 |
| 4,327,850 | 5/1982 | Robinson, Jr. | 224/103 |
| 4,335,891 | 6/1982 | Alley et al. | 280/19 |
| 4,396,091 | 8/1983 | Anderson | 182/3 |
| 4,397,500 | 8/1983 | Moffitt . | |
| 4,431,121 | 2/1984 | Bensetta | 224/153 |
| 4,444,375 | 4/1984 | Horn | 254/346 |
| 4,529,240 | 7/1985 | Engel | 294/74 |
| 4,706,858 | 11/1987 | Whatley | 224/184 |
| 4,828,307 | 5/1989 | Sokol et al. | 294/79 |
| 4,941,313 | 7/1990 | Anderson et al. | 54/24 |
| 5,029,921 | 7/1991 | Houghton et al. | 294/26 |
| 5,145,224 | 9/1992 | Welk | 294/2 |
| 5,161,843 | 11/1992 | Baldwin | 294/26 |
| 5,316,356 | 5/1994 | Nutting | 294/118 |
| 5,382,064 | 1/1995 | Blais | 294/26 |
| 5,393,194 | 2/1995 | Smith | 414/546 |

*Primary Examiner*—Dean J. Kramer
*Attorney, Agent, or Firm*—Duane, Morris & Heckscher LLP

[57] ABSTRACT

A harness fits the head of an animal carcass for dragging the carcass with a tether line. The harness has an elongated connector coupled to a longitudinal adjustment strap, and a length of flexible strap coupled in a figure eight with a sliding connection at its central crossing, thereby forming first and second loops. A ring or other pull fitting for the tether line is attached to an end of the connector member adjacent to a sliding connection with the flexible strap at the front, and the longitudinal adjustment strap is coupled between the connector member and a sliding connection with the flexible strap at the rear. The first loop fits around the snout of a carcass such as a deer. The second loop includes a length adjustment between opposite ends of the flexible strap, which adjusts the circumference of both loops due to the sliding connection at the central crossing. The second loop is fitted around neck of the carcass and optionally also the front legs. The longitudinal adjustment strap spaces the loops longitudinally to conform to the length of the head and the length adjustment in the second loop allows the first and second loop to be cinched tight.

12 Claims, 4 Drawing Sheets

APPARATUS FOR HAULING AN ANIMAL CARCASS

BACKGROUND OF THE INVENTION

1. Field of the Invention

The invention relates to a harness for dragging an animal carcass such as a deer. In particular, the invention relates to a harness which is fitted about the head of an animal carcass and is attachable to a tether line for pulling the carcass along the ground. The harness is adjustable by slip fittings between transversely oriented straps and includes length adjustments permitting the harness to be fitted to engage the animal's head and can be arranged also to engage the animal's front legs adjacent to the head.

2. Prior Art

It can be difficult for hunters to remove the carcass of a large animal such as a deer, elk or moose from the area where the animal was killed. Often, hunting is done in rough or wooded terrain and kills often occur at a remote location without clear paths and at a substantial distance from the hunters' camp or vehicle. The carcass of the animal must be transported by the hunter to a base camp or vehicle. One possible method for transporting the carcass is for the hunter to carry it over his shoulder, but this is undesirable because the carcass may be large and heavy, and is likely to be bloody. Furthermore, it is dangerous to carry a deer because an elevated moving deer carcass could easily be mistaken by another hunter for a live deer, with fatal consequences to the person carrying the carcass. Therefore, it is preferred to drag the carcass along the ground.

One method employed for dragging a carcass is to loop one end of a rope around the animal in a slip knot, optionally to attach a stick at the other end of the rope, and with one person on each side of the carcass, to drag the animal toward the destination. The rope is normally attached at the neck. In the case of deer, if the rope is affixed to the neck, the feet may tend to snag on obstacles, or if attached to the front legs, antlers may snag. However the rope is attached, the hunter may need to maneuver the carcass between and over trees, bushes, rocks and other obstacles.

The rope or drag line may be long, but a relatively short rope is advantageous in view of the occasional need to lift the carcass to clear obstacles and/or to return to the carcass to clear it when snagged by trees, brush or the like. This simple rope method can serve when two persons are available, but a single person may have difficulty in moving the carcass according to this method.

U.S. Pat. No. 4,243,164—Burlison discloses an animal dragging assist in the form of a bar handle which helps a lone person to transport the carcass of an animal such as a deer, dragged along on its back. The device comprises a short bar or handle having a pair of spaced U-bolts at opposite ends. The front legs of the carcass are clamped to the bar by the U-bolts at the ankle joint, and the hunter grasps the bar between them. A line secured to the bar is looped under the animal's neck adjacent to the head to hold it up off the ground against lolling back on the neck. This device is compact but has a limitation in that the carcass is not streamlined in a manner that might minimize snagging and difficulty with obstacles, particular with respect to antlers. The snout of the animal carcass is not elevated and the head hangs down from the point at which the neck is attached to the bar by the line. As a result, in this arrangement the antlers and perhaps the snout of the carcass can snag on obstacles encountered in the terrain over which the carcass is dragged.

In Burlison the loop and bar must be attached to the front legs and head of the carcass at fixed relative positions defined by the spacing of the U-bolts and the length of the line. If the animal is left lying on the ground for a time, the carcass may become rigid from rigor mortis and difficult to arrange at the necessary relative positions. If the front legs stiffen in a retracted position adjacent to the torso, when the hunter grips the bar and stands upright, he may only be able to proceed by lifting the carcass substantially off the ground instead of dragging it along.

U.S. Pat. No. 2,996,228—Bauman discloses a vest-like pulling harness to be worn by the hunter to drag an animal via a drag line attached to the animal's neck. The harness has a breast pad attached to individually length adjustable belt and shoulder straps coupled to an eye ring at the back of the harness, to which the drag line is affixed. Bauman allows the hunter to drag the carcass without having to lift it. However, Bauman's arrangement fails to orient the carcass or to deal with the lack of streamlining due to the antlers, snout and front legs, which can become entangled in obstacles such as trees or rocks. Devices similar to Bauman are disclosed, for example, in U.S. Pat. Nos. 3,077,292—Gehrke; 4,397,500—Moffitt; and, 2,931,629—Keller.

SUMMARY OF THE INVENTION

A harness is fitted over the head of an animal carcass to facilitate dragging the carcass along the ground. The harness prevents the snout of the carcass from becoming entangled in obstacles by orienting and elevating it. The harness allows a hunter to drag the carcass along the ground without lifting a substantial portion of the weight of the carcass, and is snugly but adjustably fittable over the head of animals over a range of sizes. The adjustments can be used to cause the harness to engage the head and the front legs to streamline the carcass. The harness is attachable to a tether line and is adjustable over and under the head of the carcass. The tether line is affixed to an end of a longitudinal length of strap that extends forwardly on the head from a transverse section of strap, tending to maintain the head and the carcass in a position which prevents twisting of the carcass as its is dragged along the ground.

The harness preferably comprises an elongated connector member, a first strap and a second strap. A pull fitting is attached to one end of the connector member. The pull fitting allows for attachment of a tether line to the harness.

The first strap is attached to the connector member near the pull fitting. The attachment of the first strap to the connector member divides the first strap into a first and a second portion. The first portion is connected substantially at its mid point to the second portion, by a sliding connector forming a first loop which is adjustable so as to be fitted tightly about the snout of the carcass. The first portion is also attached to the second portion by a buckle so as to form a second adjustable loop. The second adjustable loop is fitted about the neck of the carcass and is expandable to engage around the front legs of the animal carcass as well, namely as brought against the neck. The second strap is attached to the end of the connector member, opposite the pull fitting, by a buckle such that the harness can be longitudinally adjusted along the front of the head of the carcass. The distal end of the second strap is attached by a sliding connection near the distal end of the first portion of the first strap.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS

Figure 1:
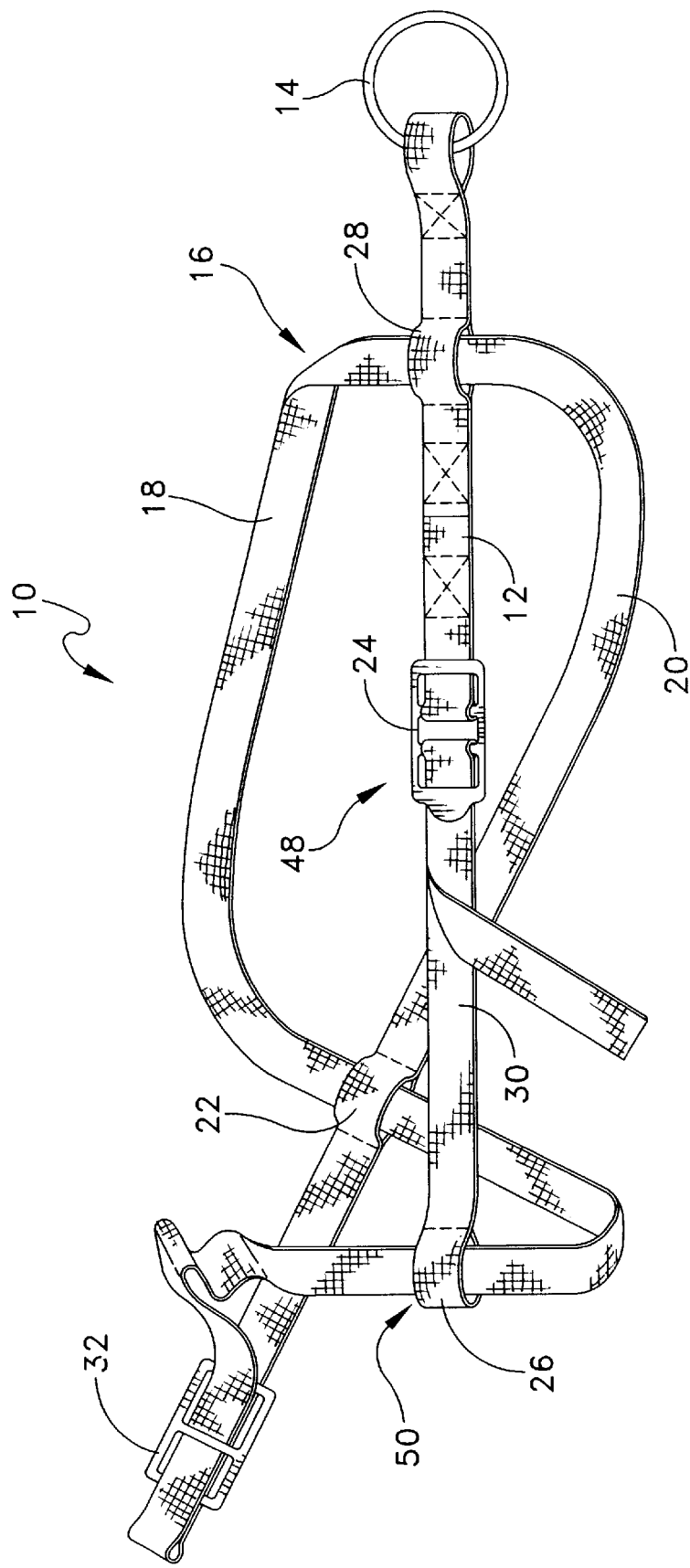
FIG. 1 is an overhead view of the harness of the invention.

The invention is described in detail with reference to the accompanying drawings in which the same reference numerals are used throughout to identify corresponding elements. A harness 10 for dragging an animal carcass is shown in FIGS. 1–4. As shown in FIG. 1, the harness 10 comprises a connector member 12, a first strap 16 and a second strap 30.

Harness 10 as shown forms a figure eight of a continuous length of strap defining two portions 18, 20. At the center of the figure eight the strap has a slide fitting 22 coupling the crossing first and second portions 18, 20 of the strap. Along the figure eight, a buckle 32 permits the end portions of strap portions 18, 20 to be passed over one another and fixed, thereby enlarging or diminishing the size of the openings in the figure eight. One opening encircles the animal's snout and the other encircles the neck, with the strap portions 18, 20 crossing on one side of the head (e.g., under the head). A longitudinal part is formed by connecting member 12 and a second strap 30, which are coupled by a second buckle 24 for length adjustment. The connecting member is coupled to the continuous length of strap by a slide fitting 28 and has a ring or pull fitting 14 on a tail that protrudes beyond the figure eight at one end. At the opposite end of the figure eight, second strap 30 is likewise attached via slide fitting 26.

With end buckle 32 undone, harness 10 is pulled over the animal's snout so that a first adjustable opening 48 (namely half of the figure eight) is brought back along the snout from the nose, and the central crossing portion at slide fitting 22 is under the head. The second half of the figure eight is closed around the animal's neck by re-attaching buckle 32. Then either successively or in combination, the longitudinal buckle 24 is adjusted in length to draw the snout and neck loops longitudinally toward one another and the circumferences of the openings in the figure eight are cinched inward such that the harness is snugly and securely attached to the animal's head.

Figure 3:
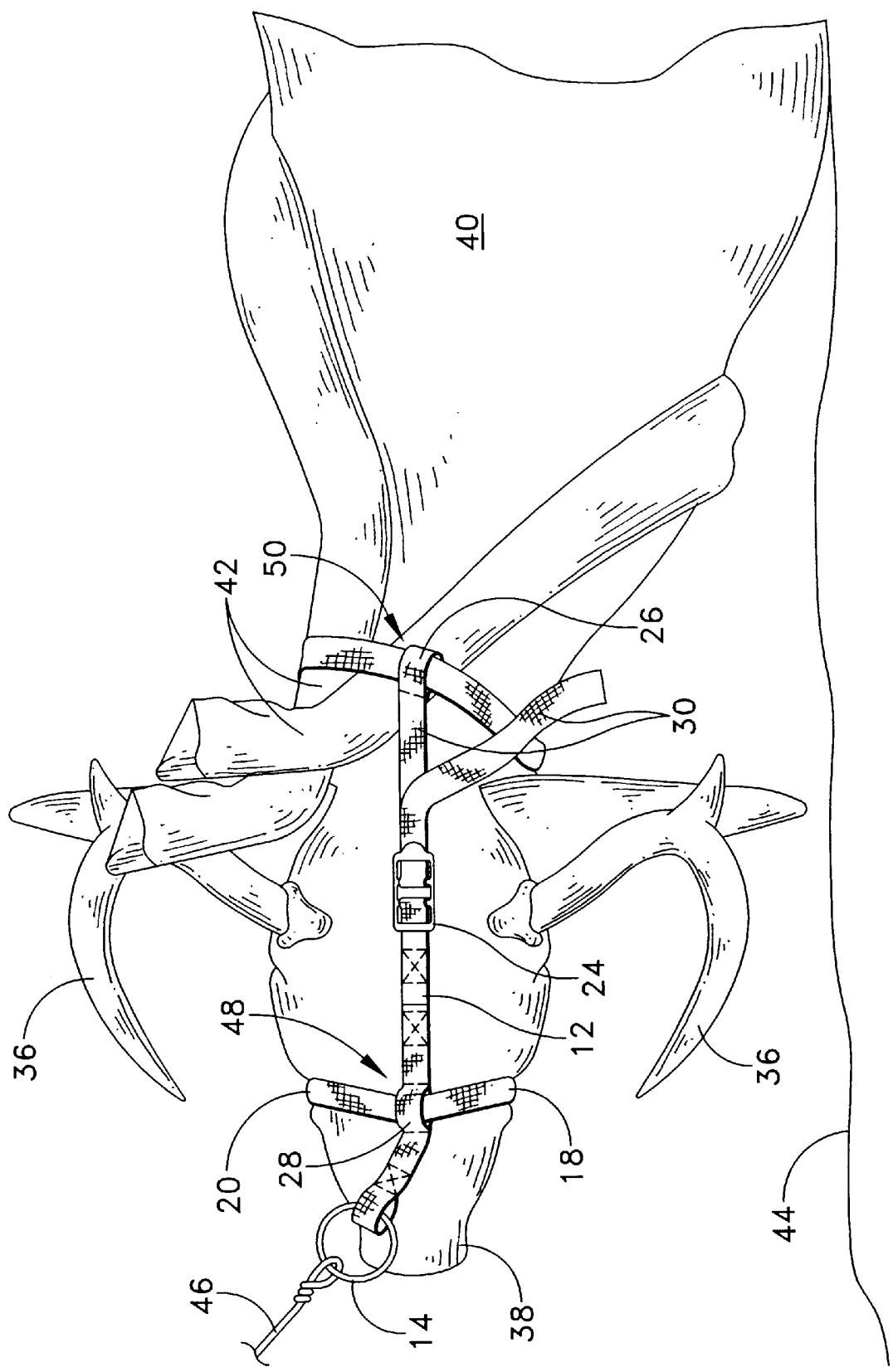
FIG. 3 is an overhead view of the harness shown fitted about the head and front legs of an animal carcass.
Figure 4:
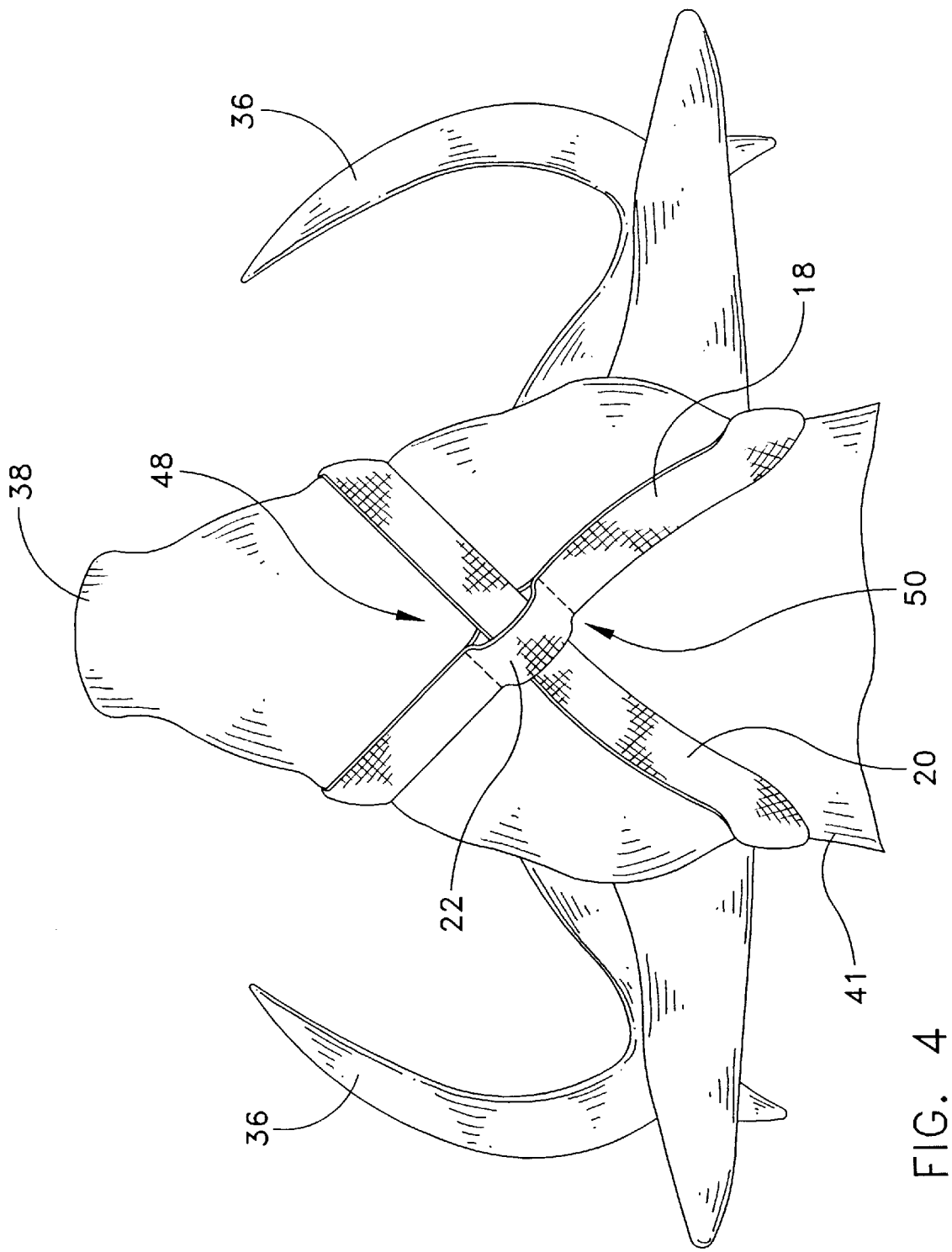
FIG. 4 is a bottom view of the harness shown fitted about the head of an animal carcass.

The connector member 12 is preferably constructed from a flexible material such as textile webbing, but can be constructed from a rigid material such as plastic, steel or aluminum. The connector member 12 has a pull fitting 14 attached at its end opposite from buckle 24, preferably via a short tail section that spaces the pull fitting from the slide coupling 28 with strap portions 18, 20. As shown in FIG. 3, the pull fitting 14 permits a tether line 46 to be attached to the harness 10. The first strap 16 is attached to the connector member 12 behind the pull fitting 14. The proximity of the pull fitting 14 to the strap portions 18, 20 of first strap 16 places the pull fitting 14 behind the nose and over snout 38 of the carcass when the harness is placed over the carcass' head 34 as is described in greater detail below. This orientation ensures that as the tether line 46 is pulled to drag the carcass, the snout 38 is lifted off the ground, preventing the snout 38 from becoming entangled in obstacles and also minimizing the involvement of antlers 36, if any.

The attachment of the first strap 16 to the connector member 12 divides the first strap into a first portion 18 and a second portion 20. The first portion 18 is connected at its mid-point to the second portion 20 by sliding connector 22 forming a first adjustable loop 48 which is fitted about snout 38. The length of the first portion 18 and the second portion 20 is such that the first adjustable loop 48 is permitted a range of circumferential adjustment which allows the harness 10 to fit over the snout 38 of various animals. For example, harness 10 can be fitted over a smaller animal, such as a deer, or a larger animal, such as a moose or a bear.

The second adjustable loop 50 is formed by attaching first portion 18 and second portion 20 together at the ends of first strap 16. The first portion 18 and second portion 20 are attached together by buckle 32 which allows first portion 18 to be adjusted relative to second portion 20. Preferably, one strap end is fixed to the buckle, for example being looped over a buckle member and sewn back on itself, and the other end is slidable in the buckle and frictionally fixed when pulled tight. This effectively adjusts the circumference of both loops 48, 50, due to the fact that shortening loop 50 pulls first strap portion 18 through sliding connection 22. The second adjustable loop 50 is thereby fitted snugly around the neck 41 of the carcass 40. As shown in FIG. 3, second loop 50 can be expanded sufficiently to receive the front legs 42 of the carcass as well as the neck. Tucking the front legs 42 of the carcass behind the neck 41 is desirable because it streamlines carcass 40 and keeps it from twisting as it is dragged along the ground 44 and snagging against the ground or on obstacles. The harness tends to hold the antlers 36 and snout 38 in a relatively upturned orientation, further preventing the carcass 40 from becoming entangled on obstacles.

The second strap 30 is attached at its inner end to connector member 12 by a similar buckle 24. The second strap 30 is attached at its opposite end by a sliding connection 26 near the free end of the first portion 18 of strap 16. The second strap 30 and connector member 12 connect pull ring 14, first loop 48 and second loop 50, via sliding connections. The sliding connections can be made by overlapping a continuous length of strap material with a short strap length placed over the crossing strap and sewn on either side. Alternatively, two strap lengths can be overlapped at their ends with spaced seams sewn to define the female portion of the connection. Other forms of crossing slide connections are also possible, for example involving metal or plastic parts.

Figure 2:
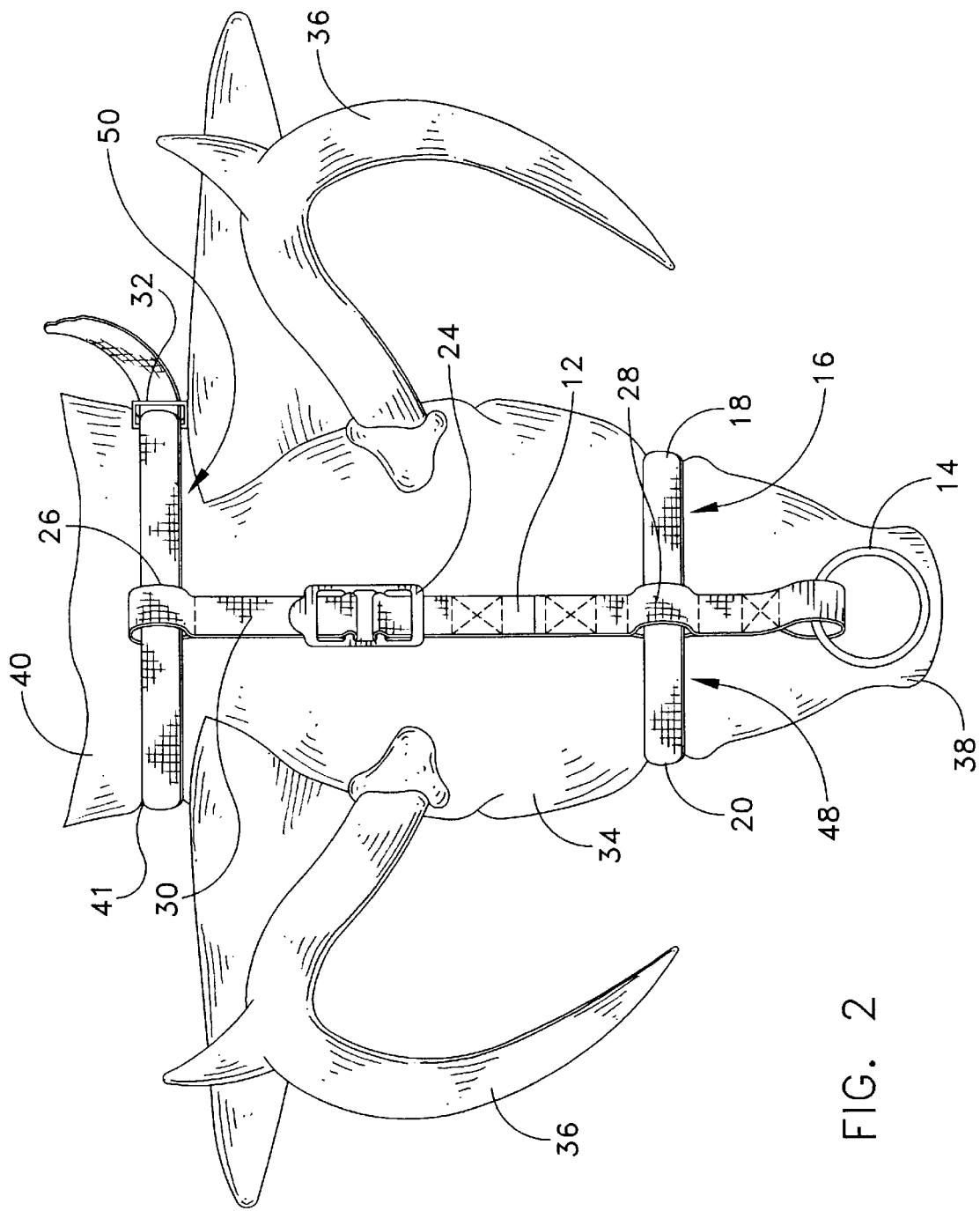
FIG. 2 is an overhead view of the harness shown fitted about the head of an animal carcass.

As shown in FIG. 2, the second strap 30 is positioned longitudinally along the top of the head 34 of the carcass. This arrangement is normally convenient, but it is also possible to attach the harness in other orientations relative to the head. Buckle 24 permits the second strap 30 to be longitudinally adjusted such that regardless of the length of the head 34 over a range permitted by the adjustability of second strap 30, the length of harness 10 can be varied, ensuring that the first loop 48 will fit snugly about the snout 38 and the second loop 50 will fit snugly about the neck 41.

The harness 10 can be fitted first to the snout and then to the neck or vice versa. Harness can be fitted about the head 34 of an animal carcass 40 by first opening or substantially expanding the circumference of the second loop 50 and adjusting the second strap 30 to expand the length of the harness 10. The front legs 42 of the carcass can be placed adjacent the neck 41 to be engaged with the neck if desired. The second loop is passed over the snout 38 and positioned around neck 41 and optionally front legs 42. The second loop 50 is cinched around the neck 41 and front legs 42 by pulling the free end of first portion 18 through buckle 32. The second strap 30 is aligned with the center of the head 34 by using sliding connector 26 to move the second strap 30 along second loop 50. The circumference of first loop 48 is expanded and second strap 30 is adjusted to shorten the length of harness 10 so that first loop 48 is adjacent snout 38. One adjacent snout 38, the entire harness, including first loop 48 is cinched up by further drawing the free end of first portion 18 through buckle 32. A tether line 46 is attached to the harness 10 for pulling the carcass 40 along the ground.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A harness for attachment to the head of an animal carcass comprising:

an elongated connector member;

a means for coupling a tether line to the harness, said means being attached to one end of the connector;

a first adjustment means attached at the other end of the connector;

a first strap and a second strap, the first strap being attached to the connector so that the first strap is divided by the connector into a first portion and a second portion, the first portion being attached at a mid point of the first portion to the second portion at a sliding connection, thereby forming a first adjustable loop in the first strap, the first portion being attached at a free end to the second portion by a second adjustment means, thereby forming a second adjustable loop in the first strap; and, the second strap extending between the first adjustment means and a mid point of the second portion of the first strap by a sliding connection.

2. The harness of claim 1, wherein said means for attaching a tether line to the harness comprises a pull fitting attached to one end of said connector member.

3. The harness of claim 2, wherein said pull fitting comprises a metallic ring.

4. The harness of claim 1, wherein said first adjustment means comprises a buckle.

5. The harness of claim 1, wherein said second adjustment means comprises a buckle.

6. The harness of claim 1 wherein said first portion is attached to the distal end of the second portion by a second buckle.

7. The harness of claim 1 wherein said harness is constructed from a flexible material.

8. A harness for attachment to the head of an animal carcass comprising:

an elongated connector member;

a pull fitting attached to one end of the connector;

a first buckle attached at an other end of the connector;

a first strap and a second strap, the first strap being attached to the connector so that the first strap is divided by the connector into a first portion and a second portion, the first portion being attached at a mid point of the first portion to the second portion at a sliding connection, thereby forming a first adjustable loop in the first strap, the first portion being attached at a free end to the second portion by a second adjustment means, thereby forming a second adjustable loop in the first strap; and the second strap being attached to the connector member by the first buckle, said second strap being attached to the first portion by a sliding connection.

9. A harness comprising:

at least one continuous flexible strap having two free ends and forming a figure eight having two openings, with crossing portions of the strap coupled at a sliding connection;

a circumferential length adjustment coupling joining the two free ends, the circumferential length adjustment coupling permitting at least one of the free ends to pass the other of the free ends and to frictionally fix the free ends relative to one another whereby circumferences of the two openings are adjustable;

a longitudinal length adjustment member having sliding connections with the flexible strap permitting movement along the flexible strap, and means for shortening and lengthening the longitudinal length adjustment member; and, a pull fitting connected to one of the longitudinal length adjustment member and the flexible strap.

10. The harness of claim 9, wherein the pull fitting is affixed to the longitudinal length adjustment member by a tail extending beyond an opening of the figure eight.

11. The harness of claim 10, wherein the flexible strap is dimensioned to engage a snout and neck of a deer.

12. The harness of claim 11, wherein the flexible strap is dimensioned to engage the snout of the deer in one of the openings and the neck and front legs of the deer in a second of the openings.

* * * * *